(12) United States Patent
Hiraki et al.

(10) Patent No.: US 9,625,195 B2
(45) Date of Patent: Apr. 18, 2017

(54) INDOOR UNIT

(71) Applicant: DAIKIN INDUSTRIES, LTD., Osaka-shi, Osaka (JP)

(72) Inventors: Masato Hiraki, Kusatsu (JP); Shinji Nagaoka, Kusatsu (JP); Shigeharu Taira, Kusatsu (JP)

(73) Assignee: DAIKIN INDUSTRIES, LTD., Osaka-shi (JP)

( * ) Notice: Subject to any disclaimer, the term of this patent is extended or adjusted under 35 U.S.C. 154(b) by 0 days.

(21) Appl. No.: 15/031,800

(22) PCT Filed: Oct. 24, 2014

(86) PCT No.: PCT/JP2014/078328
§ 371 (c)(1),
(2) Date: Apr. 25, 2016

(87) PCT Pub. No.: WO2015/072311
PCT Pub. Date: May 21, 2015

(65) Prior Publication Data
US 2016/0245566 A1    Aug. 25, 2016

(30) Foreign Application Priority Data

Nov. 12, 2013    (JP) ................................. 2013-234041

(51) Int. Cl.
*F24F 1/00*      (2011.01)
*F25B 49/02*     (2006.01)
(Continued)

(52) U.S. Cl.
CPC .......... *F25B 49/005* (2013.01); *F24F 1/0007* (2013.01); *F24F 11/008* (2013.01);
(Continued)

(58) Field of Classification Search
CPC ........ F25B 2500/222; F25B 2313/0293; F24F 2011/0084
(Continued)

(56) References Cited

U.S. PATENT DOCUMENTS 4,380,760 A * 4/1983 Kornblit ............... G08B 29/181
340/333
5,398,516 A * 3/1995 Kuribara ............... F25B 49/005
62/129

(Continued)

FOREIGN PATENT DOCUMENTS

CN    1392944 A     1/2003
CN    202119010 U   1/2012
(Continued)

*Primary Examiner* — Elizabeth Martin
*Assistant Examiner* — Zachary R Anderegg
(74) *Attorney, Agent, or Firm* — Birch, Stewart, Kolasch & Birch, LLP

(57) ABSTRACT

An indoor unit includes: a casing; a heat exchanger through which a flammable refrigerant flows; a fan; a detection sensor detecting a leak of the flammable refrigerant; a warning device emitting a warning about a leak of the flammable refrigerant; a control unit controlling operations of the fan and the warning device; and an operation device inputting stop commands for the fan and the warning device to the control unit based on its manual operation. Upon detection of a leak of the flammable refrigerant by the detection sensor, the control unit starts up the fan on condition that the fan is at a stop, starts up the warning device, disregards a stop command for the fan by the operation device, and permits a stop command for the warning device by the operation device. As a result, a user is enabled to arbitrarily stop a warning started based on occurrence of a refrigerant leak.

6 Claims, 5 Drawing Sheets

(51) Int. Cl.
  *F25B 49/00* (2006.01)
  *F24F 11/00* (2006.01)
(52) U.S. Cl.
  CPC . *F24F 2001/004* (2013.01); *F24F 2011/0084* (2013.01); *F25B 49/02* (2013.01); *F25B 2313/0293* (2013.01); *F25B 2400/12* (2013.01); *F25B 2500/222* (2013.01)
(58) Field of Classification Search
  USPC ........................................ 340/605, 628, 632
  See application file for complete search history.

(56) References Cited

U.S. PATENT DOCUMENTS

| | | | | |
|---|---|---|---|---|
| 5,731,759 | A * | 3/1998 | Finucan | F21L 4/005 340/574 |
| 6,085,531 | A | 7/2000 | Numoto et al. | |
| 6,110,038 | A * | 8/2000 | Stern | F24F 11/0001 340/527 |
| 6,204,769 | B1 * | 3/2001 | Arai | B60L 3/0046 180/65.1 |
| 6,307,478 | B1 * | 10/2001 | Thompson | G08B 21/14 340/627 |
| 7,696,891 | B2 * | 4/2010 | Whitney | A62C 99/00 340/628 |
| 2002/0178738 | A1 * | 12/2002 | Taira | F24F 11/0086 62/129 |
| 2005/0081606 | A1 * | 4/2005 | Taira | G01N 33/2888 73/53.01 |
| 2005/0103029 | A1 * | 5/2005 | Kawahara | F25D 29/008 62/126 |
| 2010/0223940 | A1 * | 9/2010 | Kotani | F25B 45/00 62/149 |
| 2011/0000240 | A1 * | 1/2011 | Yamada | F25B 49/005 62/208 |
| 2011/0107780 | A1 * | 5/2011 | Yamaguchi | F25B 49/005 62/149 |
| 2012/0090383 | A1 | 4/2012 | Lopez et al. | |

FOREIGN PATENT DOCUMENTS

| | | |
|---|---|---|
| JP | 6-101913 A | 4/1994 |
| JP | 11-304226 A | 11/1999 |
| JP | 2000-028212 A | 1/2000 |
| JP | 2000-035267 A | 2/2000 |
| JP | 2000-097505 A | 4/2000 |
| JP | 2001-241784 A | 9/2001 |
| JP | 2002-098391 A | 4/2002 |
| JP | 2002-098393 A | 4/2002 |
| JP | 2004-077000 A | 3/2004 |

\* cited by examiner

INDOOR UNIT

TECHNICAL FIELD

The present invention relates to an indoor unit and, more specifically, to an indoor unit using a flammable refrigerant.

BACKGROUND ART

Conventionally, there has been known an indoor unit in which a warning is executed upon detection of a refrigerant leak. For example, an indoor unit described in JP 2000-35267 A (PTL1) has a remote controller which, when detecting a refrigerant gas, emits a warning by light and/or sound and/or display.

CITATION LIST

Patent Literature

PTL1: JP 2000-35267 A

SUMMARY OF INVENTION

Technical Problem

Conventionally, it has been the case that once emission of a warning is started, the warning emission cannot be stopped until a serviceman arrives to take countermeasure. Particularly, with a warning emitted in the form of sound output such as a buzzer, long-time execution of such warning emission in the nighttime would cause noise damage to its vicinities, leading to amplified dissatisfaction of users.

An object of the invention is, therefore, to provide an indoor unit which allows a user to stop, at the user's discretion, the emission of a warning started based on occurrence of a refrigerant leak.

Solution to Problem

An indoor unit according to the present invention comprises:
a casing;
a heat exchanger through which a flammable refrigerant flows;
a fan;
a detection sensor detecting a leak of the flammable refrigerant;
a warning device emitting a warning about a leak of the flammable refrigerant;
a control unit controlling operations of the fan and the warning device; and
an operation device inputting a stop command for the fan and a stop command for the warning device to the control unit based on a manual operation thereof, wherein
upon detection of a leak of the flammable refrigerant by the detection sensor, the control unit starts up the fan on condition that the fan is at a stop, starts up the warning device, disregards a stop command for the fan by the operation device, and permits a stop command for the warning device by the operation device.

Therefore, according to the indoor unit of the invention, the user is enabled to arbitrarily stop emission of a warning started based on occurrence of a refrigerant leak.

It is assumed here that the term, flammable refrigerant, includes slightly flammable refrigerants.

In the indoor unit of one embodiment of the invention, the warning device is a sound producing device.

Therefore, according to the indoor unit of one embodiment of the invention, since a warning about a leak of the refrigerant is emitted by sound, the user is allowed to more easily perceive a leak of the refrigerant. In particular, it can be prevented that a continued sound output from the sound producing device for warning emission may cause noise damage to its vicinities.

In the indoor unit of one embodiment of the invention, the warning device includes a sound producing device and a light emitting device.

Therefore, since a warning about a leak of the refrigerant is produced by sound production and light emission, the user is allowed to more easily perceive a leak of the refrigerant. In particular, it can be prevented that a continued sound output from the sound producing device for warning emission may cause noise damage to its vicinities.

In the indoor unit of one embodiment of the invention, the control unit stops the fan after elapse of a specified time subsequent to detection of a leak of the flammable refrigerant.

Therefore, according to the indoor unit of one embodiment of the invention, the user is allowed to recognize by a stop of the fan that the risk entailed by a leak of the refrigerant has decreased to some extent. Also, in the case of a low risk entailed by the refrigerant leak, occurrence of noise and increases in power consumption level due to continued driving of the fan can be suppressed.

Advantageous Effects of Invention

According to the indoor unit of the invention, emission of a warning started based on occurrence of a refrigerant leak can be stopped at the user's discretion.

DESCRIPTION OF EMBODIMENTS

Hereinbelow, the present invention will be described in detail by embodiments thereof illustrated in the accompanying drawings.

First Embodiment

Figure 1:
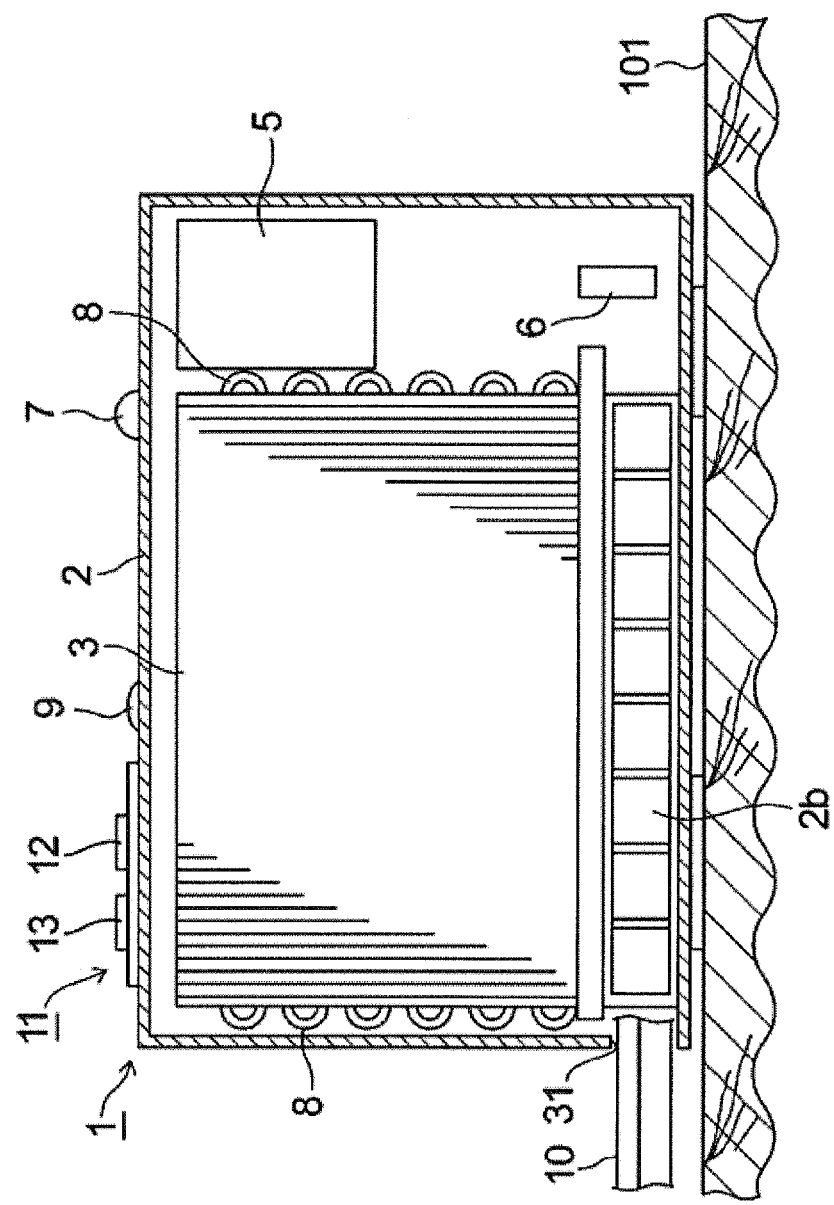
FIG. 1 is a sectional view of an indoor unit according to a first embodiment of the invention, as viewed from a front thereof.
Figure 2:
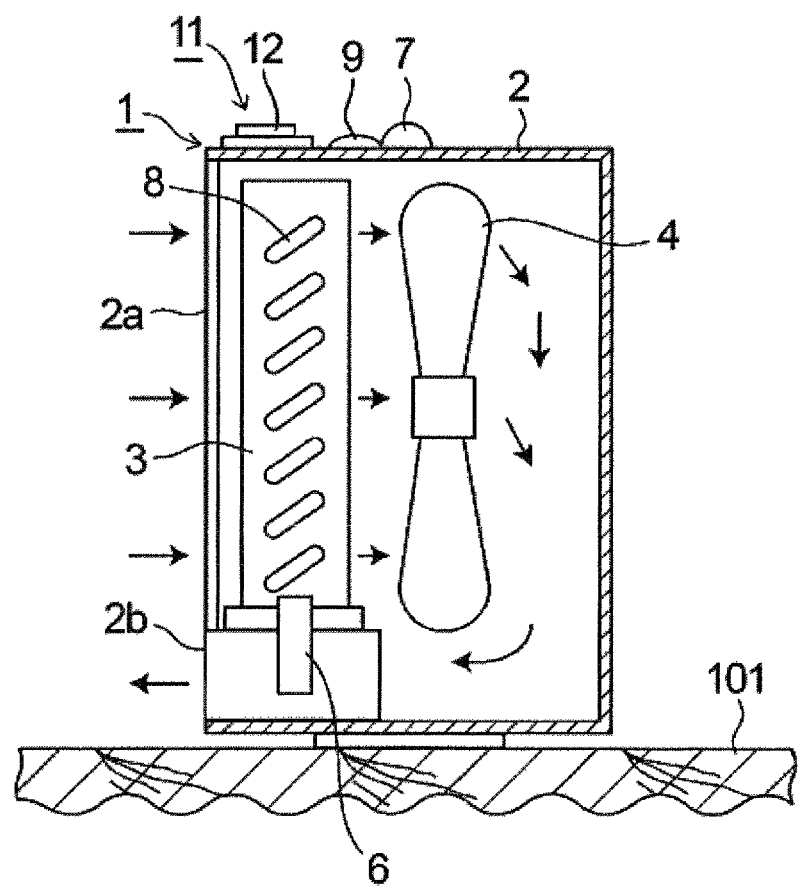
FIG. 2 is a sectional view of the indoor unit of the first embodiment, as viewed from the right side.

FIG. 1 is a sectional view of an indoor unit according to a first embodiment of the invention, as viewed from a front thereof. FIG. 2 is a sectional view of the indoor unit of the first embodiment, as viewed from the right side. As shown in FIGS. 1 and 2, the indoor unit 1 includes a casing 2, a heat exchanger 3, a fan 4, a control unit 5, a detection sensor 6, a buzzer 7, an operation lamp 9, and an operation panel 11.

The indoor unit 1 is placed indoors. The indoor unit 1 is connected to an unshown outdoor unit to constitute an air conditioner.

The casing 2, which is a floor setting type one, is set on an indoor floor surface 101. It is assumed here that the term, floor setting type, refers to not only types for setting on the floor surface 101 but also types for setting at positions slightly higher than the floor surface 101. The casing 2, which is generally rectangular parallelepiped-shaped, has on its frontage a suction port 2a and a blowoff port 2b. The blowoff port 2b is provided in lower part of the casing 2 and placed below the suction port 2a.

The heat exchanger 3 is placed in the casing 2. In the heat exchanger 3, a flammable refrigerant flows. The flammable refrigerant is R32. In this case, the flammable refrigerant may be a single refrigerant composed of R32 or a mixed refrigerant composed mainly of R32.

The heat exchanger 3 is connected to an unshown outdoor unit via a refrigerant pipe 10. The refrigerant pipe 10 is led into the casing 2 through a hole portion 31 provided at a lower portion in a side face of the casing 2. The refrigerant pipe 10 is connected to heat transfer tubes 8 of the heat exchanger 3. Then, the refrigerant passes through the refrigerant pipe 10 so as to be circulated between the indoor unit 1 and the outdoor unit.

The fan 4 is located behind the heat exchanger 3. As the fan 4 is rotated, indoor air is sucked into the casing 2 through the suction port 2a, then passing through the heat exchanger 3 to fulfill heat exchange with the refrigerant. Air after the heat exchange flows downward through a gap between the fan 4 and a rear plate of the casing 2, then passing through the blowoff port 2b to be blown outdoors.

The detection sensor 6 is attached in the casing 2. The detection sensor 6 is located at a lower position in the casing 2 below the heat exchanger 3. The detection sensor 6 detects concentration of the refrigerant in air to detect any leak of the refrigerant from the indoor unit 1. The detection sensor 6 is a semiconductor type flon sensor as an example. Otherwise, the detection sensor 6 may be known another sensor such as an infrared absorption sensor.

There is a fear that the refrigerant may leak from the heat transfer tubes 8 or the refrigerant pipe 10 or the like. Flammable refrigerants, having a property of being heavier than air, tends to accumulate on the floor. Accordingly, placing the detection sensor 6 on a lower side enables effective detection of leaks of the refrigerant.

The buzzer 7 is attached on a top surface of the casing 2. The buzzer 7, which is a device for outputting sound (sound-producing device), is used as a warning device for issuing a warning upon occurrence of an abnormality such as a refrigerant leak.

The operation lamp 9 is a device for outputting light such as an LED lamp (light emitting device). The operation lamp 9 is used basically as a display device for displaying an operation status of the indoor unit 1. That is, the operation lamp 9 is lit during operation of the indoor unit 1, i.e., keeps lit while an unshown compressor is operating and moreover the fan 4 is operating. In this embodiment, the operation lamp 9 is used also as a warning device for issuing a warning by flickering upon occurrence of an abnormality such as a refrigerant leak.

The operation panel 11 is attached on the top surface of the casing 2. The operation panel 11 is an operation device for inputting operation commands for the indoor unit 1. The operation panel 11 has a buzzer stop button 12 and an operation stop button 13 as input devices relating to emission of a warning about a refrigerant leak.

The buzzer stop button 12, which is a pushbutton switch, is an input device for inputting a stop command for the buzzer 7 to the control unit 5 on a basis of its manual operation.

The operation stop button 13, which is a pushbutton switch, is an input device for inputting a stop command for operation of the indoor unit 1 to the control unit 5 on a basis of its manual operation. It is noted here that the term, operation of the indoor unit 1, refers to operation of the unshown compressor, operation of the fan 4, and operation of the operation lamp 9.

The control unit 5 is attached in the casing 2. The control unit 5 controls the operation of the indoor unit 1.

Figure 3:
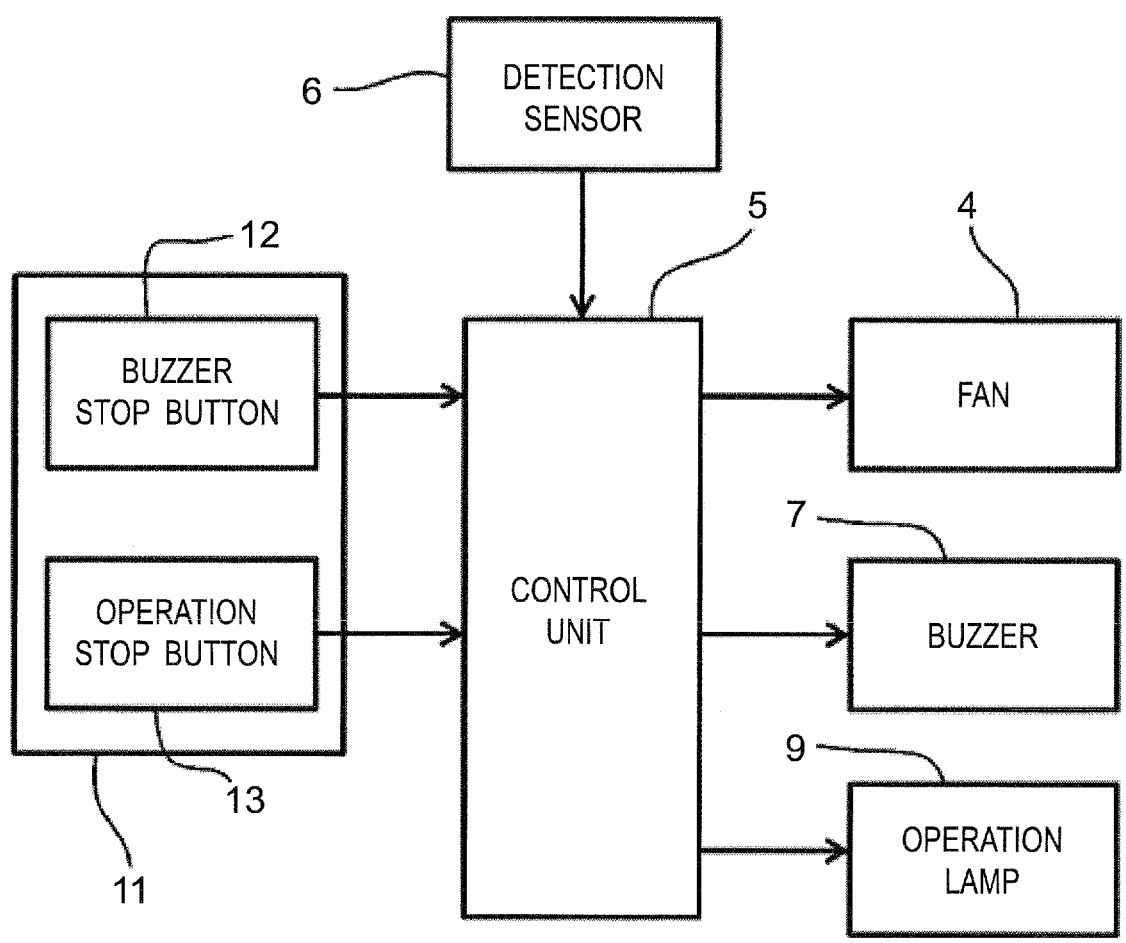
FIG. 3 is a control block diagram showing a control mechanism relating to emission of a warning about a refrigerant leak according to the first embodiment.

FIG. 3 is a control block diagram showing a control mechanism relating to emission of a warning about a refrigerant leak according to the first embodiment. Based on an output signal from the detection sensor 6, the control unit 5 decides whether or not a refrigerant leak from the heat exchanger 3 and/or the refrigerant pipe in the indoor unit 1 has occurred. If the control unit 5 decides that a refrigerant leak has occurred, the control unit 5 activates the fan 4 so as to make the refrigerant diffused in air, and moreover activates the buzzer 7 and the operation lamp 9 as warning devices in order to emit a warning to the user about the refrigerant leak. In this case, the buzzer 7 outputs a warning sound and the operation lamp 9 flickers repeatedly. When the buzzer stop button 12 is pressed while the buzzer 7 is outputting the warning sound, the control unit 5 stops the buzzer 7 from operating. Meanwhile, even if the operation stop button 13 is pressed while the fan 4 and the operation lamp 9 are operating, the control unit 5 disregards a stop command for the fan 4 and a stop command for the operation lamp 9 derived from operation of the operation stop button 13, allowing the fan 4 and the operation lamp 9 to continue operating. A concrete processing flow therefor will be described below.

Figure 4:
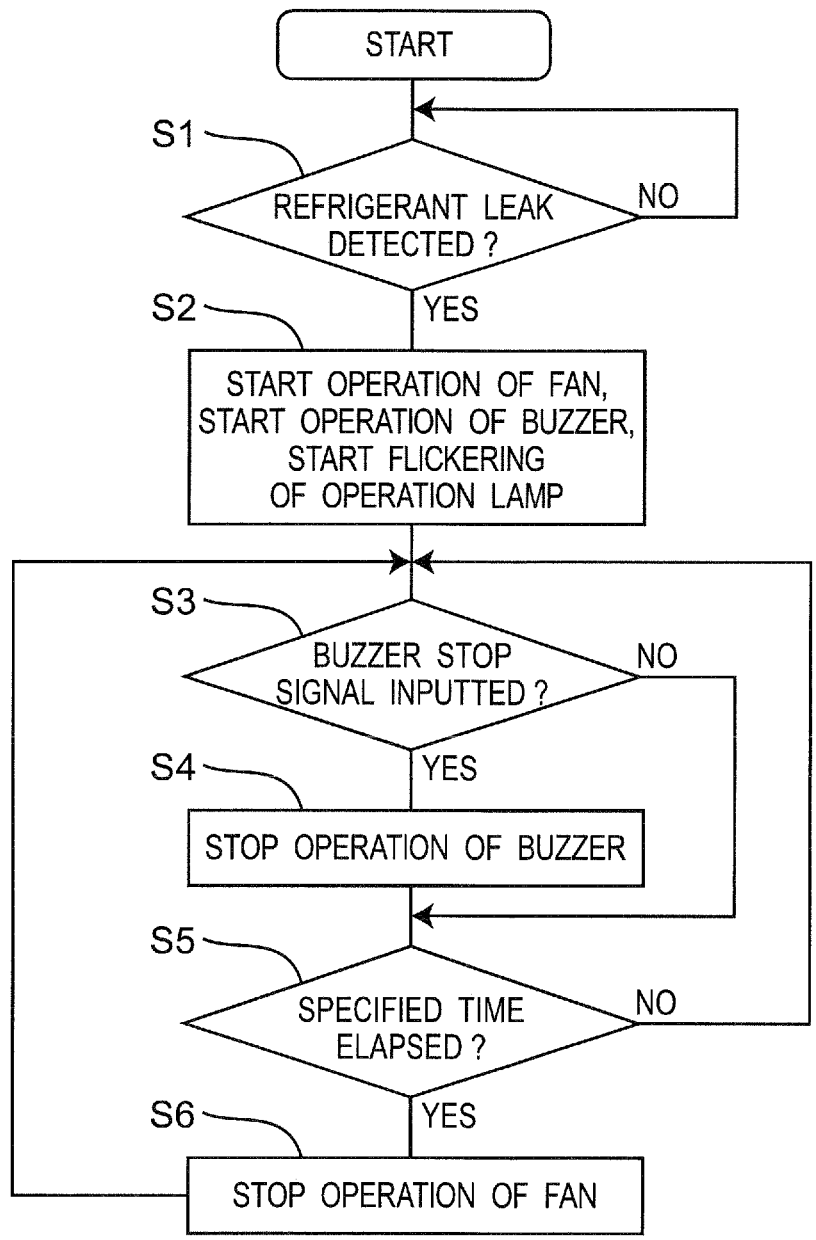
FIG. 4 is a flowchart showing a processing flow relating to the emission of a warning about a refrigerant leak according to the first embodiment.

FIG. 4 is a flowchart showing a processing flow relating to the emission of a warning about a refrigerant leak according to the first embodiment. As the indoor unit 1 is powered on, the control unit 5 starts the processing flow, followed by execution of step S1.

At step S1, based on an output signal from the detection sensor 6, the control unit 5 decides whether or not a refrigerant leak has been detected. If the refrigerant leak is detected, then step S2 is executed. If the refrigerant leak is not detected, step S1 is executed once again.

As step S2 is started, the operation mode of the indoor unit 1 changes from normal mode to error mode. With the operation mode set in the error mode, the operation mode does not return to the normal mode without undergoing recovery work by a serviceman, prohibiting the indoor unit 1 from resuming the operation.

At step S2, the control unit 5 starts operation of the fan 4, starts operation of the buzzer 7, and starts flickering of the operation lamp 9. While the indoor unit is under operation, the control unit 5 stops the operation of the indoor unit 1 at step S2. As the indoor unit 1 is stopped from operating, it follows basically that the compressor and the fan 4 are stopped from operating while the lit operation lamp 9 is extinguished. However, after detection of a refrigerant leak, i.e., at step S2, the control unit 5 stops the compressor from operating and extinguishes the operation lamp 9, but does not stop the fan 4 from operating. That is, at step S2, the control unit 5 makes the stopped fan 4 started up or lets the operating fan 4 continue operating. Next to step S2, step S3 is executed.

At step S3, the control unit 5 decides whether or not a buzzer stop signal has been inputted. In this case, when the buzzer stop button 12 is operated by the user, the buzzer stop signal is inputted to the control unit 5. If a buzzer stop signal has been inputted, then step S4 is executed. If no buzzer stop signal has been inputted, then step S5 is executed without execution of step S4. At step S4, the control unit 5 stops the buzzer 7 from operating. As a result, the emission of a warning about a refrigerant leak by sound output is stopped. Next to step S4, step S5 is executed.

At step S5, the control unit 5 decides whether or not a specified time has elapsed since a start time of operation of the fan 4. As described above, when a refrigerant leak is detected, the control unit 5 makes the fan 4 operate so that the refrigerant is diffused in air. Since a flammable refrigerant has a property of being heavier than air, the leaked refrigerant tends to accumulate on the floor without being diffused while the fan 4 is at a stop. Meanwhile, it is considered that when the fan 4 has been operating for a certain time duration, the refrigerant is sufficiently diffused without being accumulated again on the floor. Therefore, a minimum continuous operating time of the fan 4 required to achieve the diffusion of the refrigerant is specifically determined in consideration of the power of the fan 4 and the capacity of the room in which the indoor unit 1 is placed. This minimum necessary continuous operating time is set as a specified time, which is 30 min. as an example. If the specified time has elapsed, then step S6 is executed. If the specified time has not elapsed, step S3 is executed once again. At step S6, the control unit 5 stops the fan 4 from operating. Next to step S6, step S3 is executed once again.

In addition, even if the operation stop button 13 is operated, the fan 4 is not stopped from operating. Upon detection of a refrigerant leak, the control unit 5 thereafter disregards any operation stop signal inputted from the operation stop button 13 to the control unit 5. The operation stop signal is a signal for stopping the compressor, the fan 4 and the operation lamp 9 from operating, including a stop signal for the fan 4 and a stop signal for the operation lamp 9. Therefore, the processing flow shown in FIG. 4 does not include a step of deciding whether or not an operation stop signal has been inputted.

In addition, the fan 4 may be continued operating until the operation mode is changed from error mode to normal mode, i.e., until the recovery work by a serviceman is completed. That is, in the processing flow of FIG. 4, the steps S5, S6 are not indispensable processes, so that the processing flow including neither of steps S5, S6 may be arranged. In this case, next to step S4, step S3 is executed once again.

The indoor unit 1 according to the first embodiment has the following functions and effects by virtue of the following constitution as described above.

The indoor unit 1 according to the first embodiment includes a casing 2, a heat exchanger 3 through which a flammable refrigerant flows, a fan 4, a detection sensor 6 for detecting a leak of the flammable refrigerant, a warning device (buzzer) 7 for issuing a warning about a leak of the flammable refrigerant, a control unit 5 for controlling operations of the fan 4 and the warning device 7, and an operation device (operation panel) 11 for inputting stop commands for the fan 4 and the warning device 7 to the control unit 5 based on its manual operation. Upon detection of a leak of the flammable refrigerant by the detection sensor 6, the control unit 5 starts up the fan 4 on condition that the fan 4 is at a stop, starts up the warning device 7, disregards a stop command for the fan 4 by the operation device 11, and permits a stop command for the warning device 7 by the operation device 11.

Upon detection of a leak of the flammable refrigerant, the fan 4 is started up on condition that the indoor unit 1 is at a stop, and the fan 4 is continued operating while the indoor unit 1 is operating. As a result of this, air around the indoor unit 1 is stirred. In this case, even if a stop command for the fan 4 is inputted by the operation device 11, the control unit 5 disregards the stop command for the fan 4, so that the fan 4 is maintained operating. Thus, the refrigerant that has been residing at low positions can be prevented from increasing in concentration. Meanwhile, since the control unit 5 permits a stop command for the warning device 7 by the operation device 11, the warning device 7 can be stopped arbitrarily. When a stop command for the warning device 7 is inputted by operation of the operation device 11, the user has recognized that a refrigerant leak has occurred. Since a warning has been emitted once, the user is prompted to ventilate indoor air so that the risk entailed by the refrigerant leak has decreased. That is, even if the warning device 7 is stopped from operating by operation of the operation device 11, the aim of warning the refrigerant leak has been achieved, causing no problems.

Therefore, according to the indoor unit 1 of the first embodiment, a warning emission started based on occurrence of a refrigerant leak can be stopped at the user's discretion.

It is assumed here that the term, flammable refrigerant, includes slightly flammable refrigerants as well.

In the indoor unit 1 of the first embodiment, the warning device 7 is a sound producing device 7.

Therefore, according to the indoor unit 1 of the first embodiment, since a warning about a refrigerant leak is emitted by sound, the user is allowed to more easily perceive the refrigerant leak. In particular, it can be prevented that a continued sound output from the sound producing device for the purpose of warning emission may cause noise damage to its vicinities.

In the indoor unit 1 of the first embodiment, the control unit 5 stops the fan 4 after elapse of a specified time subsequent to detection of a leak of the flammable refrigerant.

As described above, the fan 4 is maintained operating after detection of a refrigerant leak. As the operating time of the fan 4 is prolonged, air stirring progresses on and on, so that the refrigerant that has been residing at low positions is less likely to go higher in density. That is, as the operating time of the fan 4 is prolonged, the risk entailed by a refrigerant leak decreases. When the operating time of the fan 4 has elapsed to a specified time, the risk entailed by the refrigerant leak has decreased to an extent corresponding to the specified time.

Therefore, according to the indoor unit 1 of the first embodiment, the user is allowed to recognize by a stop of the fan 4 that the risk entailed by the refrigerant leak has decreased to some extent. Also, in the case of a low risk entailed by the refrigerant leak, occurrence of noise and increases in power consumption level due to continued driving of the fan 4 can be suppressed.

Also, the indoor unit 1 of the first embodiment includes the warning device (buzzer) 7 as a first warning device stoppable after detection of a refrigerant leak, and a second warning device (operation lamp) 9 unstoppable after detection of a refrigerant leak.

Therefore, according to the indoor unit 1 of the first embodiment, since a warning about a refrigerant leak is produced by sound production and light emission, the user is allowed to more easily recognize a refrigerant leak. Also, the user is enabled to arbitrarily stop the warning emission that can cause noise damage to its vicinities, and moreover the user is enabled to continue the warning emission by light emission that is less likely to cause effects on the vicinities.

Second Embodiment

Next, an indoor unit 1 according to a second embodiment will be described. The indoor unit 1 of the first embodiment, including the buzzer 7 and the operation lamp 9 as warning devices, is enabled to stop operation of the buzzer 7. Meanwhile, the indoor unit 1 according to the second embodiment, including the buzzer 7 and the operation lamp 9 as warning devices, is enabled to stop not only operation of the buzzer 7 but also operation of the operation lamp 9. Hereinbelow, common reference signs are used for common component elements between the first embodiment and the second embodiment, and description as to those common component elements is omitted.

Figure 5:
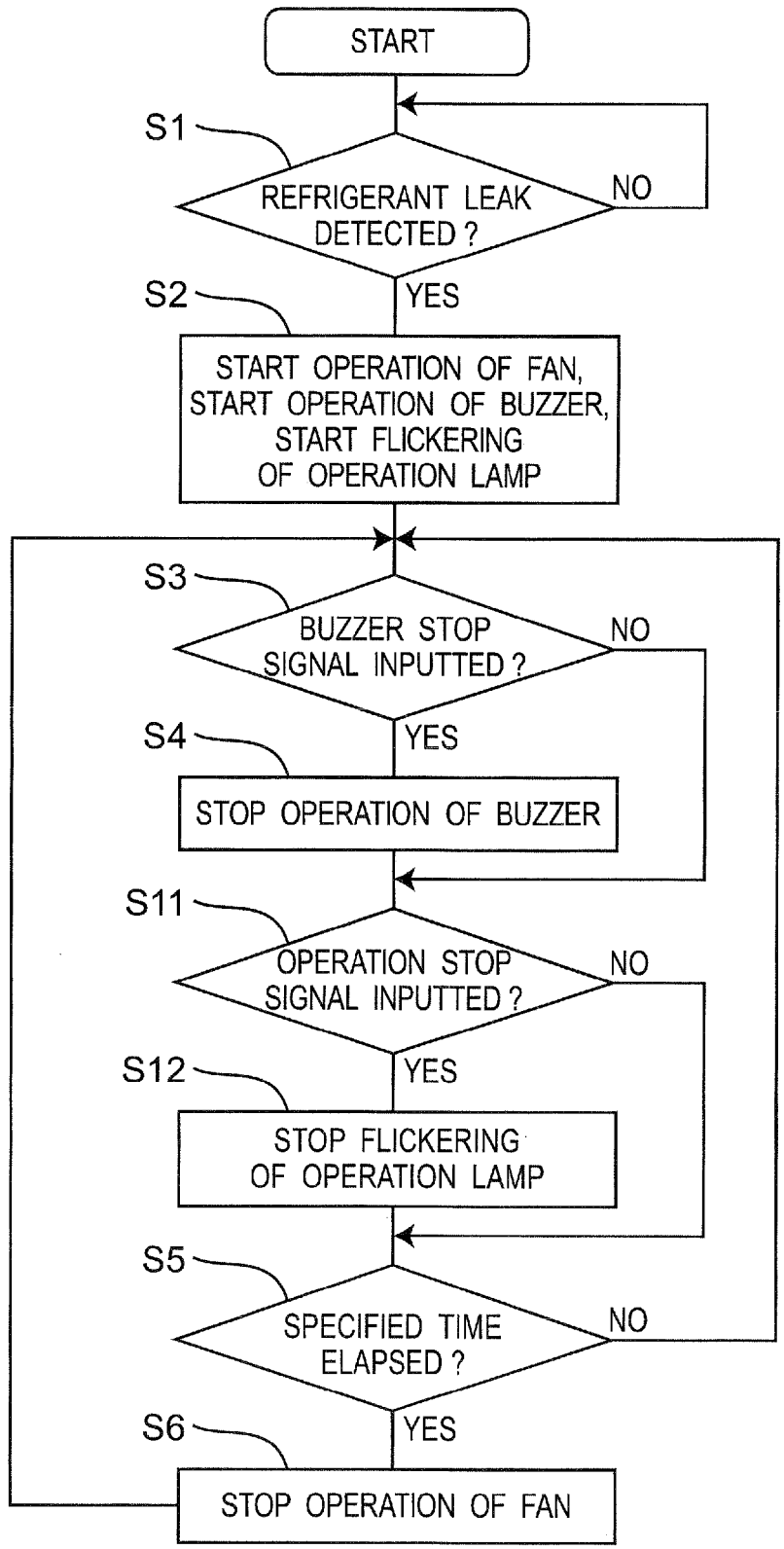
FIG. 5 is a flowchart showing a processing flow relating to the emission of a warning about a refrigerant leak according to a second embodiment.

FIG. 5 is a flowchart showing a processing flow relating to the emission of a warning about a refrigerant leak according to the second embodiment. The processing flow according to the second embodiment includes step S11 and step S12 in addition to the steps of the processing flow according to the first embodiment. The step S11 and step S12 other than included in the processing flow of the first embodiment will be described below.

Step S11 is executed next to step S4 or when no buzzer stop signal has been inputted at step S3. At step S11, the control unit 5 decides whether or not an operation stop signal has been inputted. If an operation stop signal has been inputted, then step S12 is executed. If no operation stop signal has been inputted, step S5 is executed without execution of step S12. However, at step S12, the control unit 5 disregards a stop command for the fan 4 and stops only operations of the compressor and the operation lamp 9 as described above. As a result of this, the emission of a warning about a refrigerant leak by optical output is stopped. Next to step S12, step S5 is executed.

The indoor unit 1 according to the second embodiment has the following functions and effects by virtue of the following constitution as described above. Components, functions and effects unique to the second embodiment only will be described below.

In the indoor unit 1 of the second embodiment, the warning device includes a sound producing device (buzzer) 7 and a light emitting device (operation lamp) 9.

Therefore, according to the indoor unit 1 of the second embodiment, since a warning about a refrigerant leak is produced by sound production and light emission, the user is allowed to more easily recognize the refrigerant leak. In particular, it can be prevented that continued sound output from the sound producing device for warning emission causes noise damage to the vicinities.

In the indoor unit 1 of the second embodiment, the operation lamp 9 is used not only as a display device for displaying an operation status of the indoor unit but also as a light emitting device for issuing a warning about a refrigerant leak. A light emitting device for issuing only a warning about a refrigerant leak may be provided independently of the operation lamp 9.

(Modification)

The present invention is not limited to the above-described embodiments and its design changes and modifications may be made unless those changes and modifications depart from the gist of the invention.

Although the casing is provided in a floor setting type in the above embodiments, yet the casing may also be in such a casing type (Jibukuro type) that at least part of the casing is buried in recessed part provided in a wall surface close to an indoor floor. According to such a casing type, the flammable refrigerant, having a property of being heavier than air, tends to accumulate on the floor without being diffused. Under such circumstances, a refrigerant leak can be effectively detected irrespectively of aged deterioration of the detection sensor.

Although the casing is provided in a floor setting type in the above embodiments, yet the casing may also be in such a casing type (Tenbukuro type) that at least part of the casing is buried in recessed part of a wall located at a position slightly lower than the ceiling. In such a casing type also, a refrigerant leak can be effectively detected irrespectively of aged deterioration of the detection sensor.

Although the blowoff port of the casing is provided in lower part of the casing in the above embodiments, yet the blowoff port may be provided also in upper part of the casing in addition to lower part of the casing.

Although R32 is used as the flammable refrigerant in the above embodiments, yet such other flammable refrigerants as propane or propane-containing mixed refrigerants are also usable.

Although the detection sensor is placed within the casing in the above embodiments, yet the detection sensor may be placed at a hole portion which is provided in the casing so as to allow passage therethrough between inside and outside of the casing. In such a case, a refrigerant that has leaked inside and outside of the casing can be detected.

In the above embodiments, the operation device includes a buzzer stop button for stopping the buzzer, and an operation stop button for stopping the fan and the operation lamp. The operation device may include three exclusive-use buttons corresponding to the buzzer, the fan and the operation lamp, respectively, or may include one button serving for all of the buzzer, the fan and the operation lamp. The correspondence of the operation device to the fan and the warning device is not limitative.

REFERENCE SIGNS LIST 1 indoor unit
2 casing
3 heat exchanger
4 fan
5 control unit
6 detection sensor
7 buzzer (warning device)
9 operation lamp (warning device)
11 operation panel (operation device)

The invention claimed is:
1. An indoor unit comprising:
a casing;
a heat exchanger through which a flammable refrigerant flows;
a fan;
a detection sensor detecting a concentration of the flammable refrigerant in air to detect a leak of the flammable refrigerant, with such a placement that the heat exchanger, the fan and the detection sensor are contained in the casing, the detection sensor being positioned on a downstream side of the heat exchanger with respect to an air flow generated by the fan;
a warning device emitting a warning about a leak of the flammable refrigerant;
a control unit controlling operations of the fan and the warning device; and
an operation device inputting a stop command for the fan and a stop command for the warning device to the control unit based on a manual operation thereof, wherein
upon detection of the leak of the flammable refrigerant by the detection sensor, the control unit starts up the fan on condition that the fan is at a stop while letting the fan continue operating on condition that the fan is operating, starts up the warning device, disregards the stop command for the fan by the operation device, and permits the stop command for the warning device by the operation device.

2. The indoor unit as claimed in claim 1, wherein the warning device is a sound producing device.

3. The indoor unit as claimed in claim 2, wherein the control unit stops the fan after elapse of a specified time subsequent to detection of the leak of the flammable refrigerant.

4. The indoor unit as claimed in claim 1, wherein the warning device includes a sound producing device and a light emitting device.

5. The indoor unit as claimed in claim 4, wherein the control unit stops the fan after elapse of a specified time subsequent to detection of the leak of the flammable refrigerant.

6. The indoor unit as claimed in claim 1, wherein the control unit stops the fan after elapse of a specified time subsequent to detection of the leak of the flammable refrigerant.

* * * * *